United States Patent
Plotnick (12)

(10) Patent No.: US 8,805,919 B1
(45) Date of Patent: Aug. 12, 2014

(54) MULTI-HIERARCHICAL REPORTING METHODOLOGY

(76) Inventor: Fredric L. Plotnick, Jenkintown, PA (US)

(*) Notice: Subject to any disclaimer, the term of this patent is extended or adjusted under 35 U.S.C. 154(b) by 1325 days.

(21) Appl. No.: 11/738,926

(22) Filed: Apr. 23, 2007

Related U.S. Application Data

(60) Provisional application No. 60/793,743, filed on Apr. 21, 2006.

(51) Int. Cl.
| | |
|---|---|
| *G06F 15/16* | (2006.01) |
| *G06F 17/00* | (2006.01) |
| *G06Q 99/00* | (2006.01) |
| *G06Q 10/06* | (2012.01) |
| *G06Q 10/10* | (2012.01) |

(52) U.S. Cl.
CPC ............ *G06F 15/16* (2013.01); *G06F 17/00* (2013.01); *G06Q 99/00* (2013.01); *G06Q 10/06* (2013.01); *G06Q 10/10* (2013.01); *Y10S 707/99941* (2013.01)
USPC ......... 709/201; 709/218; 705/300; 707/999.1

(58) Field of Classification Search
CPC ......... G06F 15/16; G06F 17/00; G06Q 99/00; G06Q 10/06; G06Q 10/10
USPC ............... 709/201, 218; 707/999.1, E17.121; 705/300
See application file for complete search history.

(56) References Cited

U.S. PATENT DOCUMENTS

| | | | | |
|---|---|---|---|---|
| 5,077,661 | A * | 12/1991 | Jain et al. .................. 700/99 |
| 5,189,606 | A * | 2/1993 | Burns et al. ................ 705/7.23 |
| 5,771,179 | A * | 6/1998 | White et al. ................ 702/183 |
| 6,308,164 | B1 * | 10/2001 | Nummelin et al. .......... 705/7.23 |
| 6,701,345 | B1 * | 3/2004 | Carley et al. ............... 709/205 |
| 6,775,779 | B1 * | 8/2004 | England et al. ............. 726/26 |
| 7,100,195 | B1 * | 8/2006 | Underwood ................ 726/2 |
| 7,107,268 | B1 * | 9/2006 | Zawadzki et al. .......... 1/1 |
| 7,197,502 | B2 * | 3/2007 | Feinsmith .................. 1/1 |
| 7,475,137 | B2 * | 1/2009 | Holden et al. .............. 709/225 |
| 7,882,565 | B2 * | 2/2011 | Collins et al. .............. 726/27 |
| 2001/0037190 | A1 * | 11/2001 | Jung ........................... 703/1 |
| 2001/0037227 | A1 * | 11/2001 | McInnis et al. ............ 705/7 |
| 2001/0047276 | A1 * | 11/2001 | Eisenhart .................... 705/1 |

(Continued)

OTHER PUBLICATIONS

Pritsker, A.A.B. "Memorandum RM-4973-NASA, GERT: Graphical Evaluation and Review Technique," 1966, Prepared for the National Aeronautics and Space Administration, The Rand Corporation, Santa Monica, CA.

(Continued)

*Primary Examiner* — Ondrej Vostal

(74) *Attorney, Agent, or Firm* — Mendelsohn, Drucker & Dunleavy, P.C.

(57) ABSTRACT

A method for handling the automated transferal of project level data to the various entities involved in such project which may be one of several projects within the control of each entity. Project level data may be coded, extracted and conveyed to one or more of several entities involved in a project in a format permitting notification of upper levels of management of each specific entity or summarization within the hierarchy of projects within the enterprise structure of each specific entity. Similarly, project level data may be imported and sequestered within the database for the project such that such data may be used for calculations or reports relating to that project without permitting unauthorized access to such data to the entities involved in the project.

26 Claims, 2 Drawing Sheets

(56) References Cited

U.S. PATENT DOCUMENTS

| | | |
|---|---|---|
| 2002/0064149 A1* | 5/2002 | Elliott et al. .................. 370/352 |
| 2002/0077939 A1* | 6/2002 | Nicastro et al. ................. 705/29 |
| 2002/0083372 A1* | 6/2002 | Adam ............................. 714/37 |
| 2003/0061225 A1* | 3/2003 | Bowman et al. ............. 707/100 |
| 2003/0164849 A1* | 9/2003 | Barrie et al. .................. 345/733 |
| 2004/0015367 A1* | 1/2004 | Nicastro et al. .................. 705/1 |
| 2004/0093240 A1* | 5/2004 | Shah ................................ 705/2 |
| 2004/0186762 A1* | 9/2004 | Beaven et al. .................. 705/8 |
| 2005/0015360 A1* | 1/2005 | Cras et al. ......................... 707/2 |
| 2005/0028134 A1* | 2/2005 | Zane et al. ................... 717/106 |
| 2005/0060048 A1* | 3/2005 | Pierre et al. ..................... 700/28 |
| 2005/0138072 A1* | 6/2005 | Russo et al. ............... 707/104.1 |
| 2005/0177784 A1* | 8/2005 | Andrews et al. ............. 715/513 |
| 2005/0182773 A1* | 8/2005 | Feinsmith .................... 707/100 |
| 2005/0203760 A1* | 9/2005 | Gottumukkala et al. .......... 705/1 |
| 2005/0235011 A1* | 10/2005 | Minium et al. ............... 707/203 |
| 2006/0129467 A1* | 6/2006 | Chu et al. ........................ 705/26 |
| 2006/0212350 A1* | 9/2006 | Ellis et al. ....................... 705/14 |
| 2006/0242419 A1* | 10/2006 | Gaffey et al. ................. 713/176 |
| 2007/0022027 A1* | 1/2007 | Gupta et al. .................... 705/35 |
| 2007/0027868 A1* | 2/2007 | Mohammed ...................... 707/7 |
| 2007/0051487 A1* | 3/2007 | Marti et al. ................... 164/480 |
| 2007/0067252 A1* | 3/2007 | Hengerer et al. ................. 707/1 |
| 2007/0088602 A1* | 4/2007 | Yaskin et al. ................... 705/11 |
| 2007/0100648 A1* | 5/2007 | Borquez et al. ................... 705/1 |
| 2007/0124077 A1* | 5/2007 | Hedlund, Jr. .................. 701/300 |
| 2007/0214314 A1* | 9/2007 | Reuter .......................... 711/114 |
| 2007/0226678 A1* | 9/2007 | Li et al. ......................... 717/101 |
| 2008/0002776 A1* | 1/2008 | Borer et al. ............. 375/240.26 |
| 2009/0157569 A1* | 6/2009 | Henby et al. .................. 705/500 |

OTHER PUBLICATIONS

Website, http://www.ronwinterconsulting.com/ll_brochure.htm, "Logic League(TM)," Ron Winter Consulting LLC, 2003.

Cioffi, Denis F., "Leon Alderfer and the AlderGraf Scheduling System," The Schedule Keeper, 2002, pp. 1-6 [relevant pp. 1, 4 and 6], vol. 7, No. 11, Published by: The George Washington University, Washington, DC.

* cited by examiner

MULTI-HIERARCHICAL REPORTING METHODOLOGY

CROSS-REFERENCE TO RELATED APPLICATIONS

This application claims the benefit of U.S. Provisional application No. 60/793,743, filed on Apr. 21, 2006, pursuant to 35 U.S.C. §119(e), the text of which application is hereby incorporated by reference in its entirety.

BACKGROUND OF THE INVENTION

1. Field of the Invention

The invention relates to the field of projects involving the participation of several different entities. In particular the invention relates to the provision of a method and system to provide storage, manipulation, control and transferal of information relating to projects involving the participation of several different entities.

2. Description of the Related Technology

Projects requiring the cooperative efforts of team members provided by multiple commercial, governmental and non-governmental entities present a special problem with reporting. In such a situation, a specific project may be one of several under the control of or being tracked at the departmental level by each of the multiple entities. Similarly, each such department may be one of several under the control of or tracked at the division level for each entity, continuing in a hierarchical fashion to one responsible individual for each entity.

Thus, a WBS (or Work Breakdown Structure) may assign a specific individual to be responsible for each task to be performed in the subject project, such individual (and others) may report to a departmental supervisor, who in turn reports to a division supervisor and so forth until reaching the head of the commercial, governmental and non-governmental entity. Other data relating to a specific task may similarly be subject to a hierarchy of summarization, such as by resource codes and cost codes. Summarized across one project, the accumulation of all costs associated with various cost codes would yield the total cost for that one project. However, costs associated with one cost code may also be accumulated across all projects within a department, division or entire entity.

Enterprise management and reporting software, may be used to facilitate the coding and subsequent summarization by such code of all tasks of all projects under the control of or tracked by a specific commercial, governmental and non-governmental entity, this being the current state of prior art. However, while the subject project may be only one of many projects of this specific entity, it may also be one of a different set of projects under the control of, or tracked by, a different specific entity. And while a specific individual under the control of one entity may be responsible for each task to be performed in the subject project, it is typical that each of the other entities that are participating in the project may also have an individual from their organization responsible for the control or tracking of such task. Similarly, the cost code structure of one entity's enterprise may differ from that of another and each may have assigned its own resource and cost codes to the specific task. Each of these entities may desire the ability to summarize the resources or costs associated with that entity to that task and in relation to other projects under the control of or tracked by that entity.

Thus, like a family tree, it is possible to show all the descendents of two individuals or it is possible to show all the ancestors of any two individuals at a specific level, but not both. Enterprise management and reporting software, including enterprise scheduling software, is subject to this type of problem in that user defined codes assigned to various tasks or activities are typically based upon the hierarchical enterprise needs of only one master entity, while performance of the project almost always requires the cooperative efforts of at least two (and usually more) entities, each having differing hierarchical enterprise needs.

A further issue that is encountered in the provision of a multi-hierarchical reporting function is that reported information may be subject to access restrictions. Thus, certain common project data will be accessible to all users of the reporting system, but access to other project data, such as the other projects of a specific participant which may interact with the subject project, may be restricted.

Therefore, there exists a need for providing a multi-hierarchical data reporting system and method which address one or more of the foregoing issues.

SUMMARY OF THE INVENTION

Figure 1:
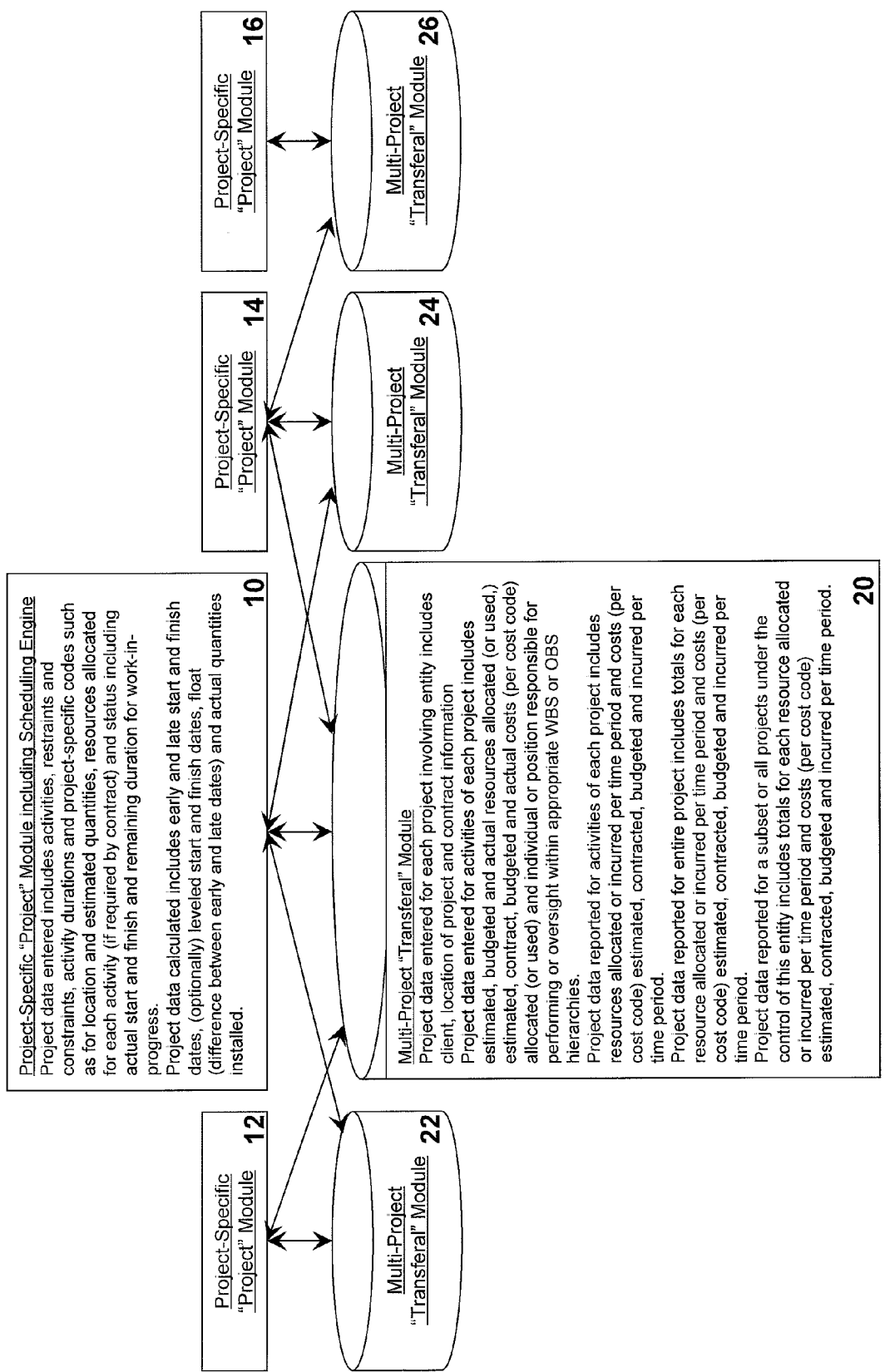
FIG. 1 is a schematic drawing of an embodiment of the multi-hierarchical system in accordance with the present invention.

The present invention relates to a transferal module for transferring project data to a plurality of users of such data. The transferal module includes the ability to link source project data with user defined or default codes to provide customizable transferal of project data to multiple entities. This may permit transferal of data relevant to that entity, using the nomenclature and terminology of that entity and in a format familiar to that entity. This may also permit introduction of security measures to limit access to proprietary data to only those entities with authorization, thereby allowing various entities to use the transferal module for additional purposes without compromising proprietary information.

DETAILED DESCRIPTION OF THE PREFERRED EMBODIMENT(S)

The various embodiments of the present invention each resolve one or more of the foregoing problems by providing software architecture that segregates data required for the common goal of advancement and completion of the project from data useful to other hierarchical levels of each of the entities related to the project. Data which is related to performing tasks associated with the project, or project specific data, is associated with a software module that may be made accessible to all entities related to the project, although specific read/write, read/only, and/or limited/view rules may apply to specific participants, if desired. Data that is proprietary, sensitive and/or which may relate to other projects, programs or processes of a specific entity involved in the project is associated with a software module which includes the ability to restrict access to all or any portion of the data, dependent on the entity and/or the project participant seeking such access.

As used herein, "transferal" refers to the reporting, notification or provision of a summary of information to an entity involved in a project.

As an example, project-scheduling software incorporating enterprise reporting capabilities may allow the assignment of various user defined data fields to each activity of the project schedule. These data fields may include:

a) the estimated duration of an activity, as well as the remaining duration of work-in-progress and actual duration of activities that have been completed,
b) the early dates of when an activity may first be performed, the late dates of when an activity must be performed if not to delay the completion of the project, the late dates of when an activity must be performed if not to delay other activities of the project, and actual dates of when the activity was performed,
c) user defined activity codes, such as contractual responsibility, location of the activity in the project, quantity of work to be performed for a specific activity and the section of the contract specifications that covers such work,
d) user defined resource codes and anticipated allocation of such resources to specific activities, such as four craftspersons from the iron workers union, one crane and one inspector,
e) actual allocation of such resources, often at a finer level of detail (e.g. hours rather than days,)
f) costs associated with the activity such as estimated, contracted, budgeted and actual costs, and
g) responsibility (direct or indirect) from an organizational viewpoint.

Data found in the data fields described in (a) through (c) above may be generally classified as project specific and thus it is generally desirable to allow these data fields to be viewable by all project team members. Data found in the data fields described in (d) through (g) above may generally be considered proprietary information that may be provided to another member or members of the project team only as required by contract (e.g. on a need to know basis) or at the discretion of the entity controlling such data. For example, a contractor may demand that a subcontractor provide data relating to the resources and anticipated allocation of such resources to specific activities to be performed by that subcontractor, but the subcontractor may rightfully desire that such information not be provided to other subcontractors on the project team. Such information may be necessary for preparation, calculation and review of standard and leveled project schedules. As such, the software module of the present invention may include a system for the subcontractor to input the required data. Access to the data could then be restricted to only the routines used to preparation, calculation and review of project schedules by the software. As a result, a schedule can be generated without other members of the project team being able to access the data input by the particular subcontractor. Similarly, knowledge that a contractor has committed to supply at least the level of resources required by contract can be provided to the project manager without providing additional information about any actual level of supply to be provided by that contractor in excess of the contract requirements.

It would be rare that a subcontractor would agree to provide actual labor hours or costs to the prime contractor if working to a fixed price lump sum contract. However, the subcontractor may desire to compare or plot such costs versus revenues earned by utilizing a linkage of cost and schedule data. Similarly, the subcontractor may desire to compare costs versus revenues earned on all projects under the control of the subcontractor. Within the organization of the subcontractor, a facilities manager may also desire to track, against time, usage of equipment for all projects in a specific region or company-wide. The system and method of the present invention can be used to permit the subcontractor to perform these functions without having to disclose all of this information to other members of the project team, some of which may be competitors of the subcontractor.

Item (g) of the list above relates to the hierarchy of responsibility in an organizational entity that may typically be provided in a WBS (work breakdown structure,) OBS (organization breakdown structure) or EPS (enterprise project structure.) Thus, for example, while a runway improvement project may be one project of the EPS for an airport authority, it may also be only one project of the EPS of a paving contractor, one project in the EPS of a paving material supplier, one project in the EPS of a landscape subcontractor and one project in the EPS of an inspecting engineering consultant. Similarly, a separate WBS and OBS will be applicable to each organizational entity, as the individuals responsible for performance or oversight each report to a supervisor who reports to further supervisor, and so forth, up to the chief of each organizational entity.

The invention provides a methodology and software architecture for interaction of a project-specific "project" module with the multiple-project "reporting" modules of each participant associated with the specific project. Both synchronous (on-line) and asynchronous (off-line) methodologies can be supported by the software architecture. The ability of the transferal module to import data from project-specific reporting software of other vendors or software architectures may optionally be supported.

A synchronous (on-line) implementation provides the ability, for example, to have project scheduling software perform a leveling routine without the necessity of individual subcontractors disclosing information on the resources to be deployed for each activity or desired maximum (being less than available maximum) resources to be allocated to the project to the other entities participating in the project. Provision of a "restricted view permission" or "validity check permission" by the subcontractor may permit the prime contractor to verify that the subcontractor has provided a stipulated available maximum allocation of its resources for purposes of running the leveling routine without compromising otherwise proprietary information of the subcontractor.

Similarly, real-time reporting of a work stoppage on one activity due to an unexpected event, such as during the countdown of a shuttle launch, could be notified to the management structure of all entities responsible for the performance or tracking of that activity. The system may allow various entities to confidentially request notification of various events relating to the project, as well as to confidentially input the recipients of such notifications. In this manner, management personnel for subcontractors can be made immediately aware of an event which may effect the scheduling of their work, such as a delay in a portion of the project which must be completed prior to the work in question, or a delay in a portion of the project which would have interfered with the work in question. In this manner, the subcontractor can make immediate adjustments to crew and equipment schedules to allocate resources to other projects when there is a delay or to allocate resources or additional resources to the project in question when a window of opportunity presents itself to accelerate work on the project.

An asynchronous (off-line) implementation provides the ability, for example, to have project scheduling software, running on a laptop of a project superintendent at a remote construction site, run all forward looking scheduling analyses and record all actual project statuses while offline, sending periodic updates of progress to the reporting modules by periodic connection to the internet, a cellular or wireless connection, floppy diskette or other transportable storage device.

Leveling routines requiring proprietary information may be performed with secure storage of proprietary data of various team members on the project-specific module which may be used by the processes of the module but are not otherwise viewable without passwords which may be optionally provided by each team member. Once again, the superintendent of the prime contractor or resident engineer of the client or owner of the project may be able to verify that a subcontractor has committed to meet a minimum level of resource availability for purpose of a joint project schedule leveling effort without being able to view the maximum availability of extra resources that the subcontractor may choose to hold in reserve.

Other applications of the present invention include:
- reporting information or directing inquiries to a supervisor of an individual team member on the project, without the need to know the name or contact information of that person,
- reporting information or directing inquiries to a subcontractor or vendor of an individual team member on the project, without the need to know the name or contact information of that entity,
- reporting information or directing inquiries to colleagues of an individual team member on the project who are at similar reporting levels on other projects of that team member's employer, without the need to know the name or contact information of that person and
- allowing an individual team member on the project to compare productivity or costs for similar tasks on other projects of that team member's employer, without the need to contact the person responsible for each such project.
- designating certain events as milestones which may or may not trigger reporting, notification and/or summarization. Such milestones can be entity-specific, for a group of entities or for the entire project.
- designating limits selected from resource limits, cost limits and date limits which trigger notification to one or more entities involved in the project.

The transferal module may also be provided with the capability to obtain source schedule data from a variety of sources and process the data in order to relate that data to various data keys in the transferal module to permit customized transfer of the source schedule data for a variety of different entities and purposes. This function may be termed "summarization" of the project data, which involves the provision of the project data to a particular entity using one or more of the coding system, terminology, data structures or formats specified by that entity. Thus, a transferal module in accordance with the present invention may include schedules generated by classic P3® for Windows®, SureTrak®, P3® for DOS (including ADM,) P3e/c®, Primavera, as well as Microsoft Project®. In addition, schedules created by lower level forms of scheduling including Microsoft Excel® and various "bar-chart makers" could be accepted by the transferal module. Where differing codes are provided in various project schedules for the same attribute, such as a specific resource, a translation function specific to the various projects under the control or tracked by a specific entity may be utilized to provide a duplicate "background" or "logical" code for purposes of enterprise summarization by that resource.

A schematic diagram of one embodiment in accordance with the present invention is shown in FIG. 1. In this embodiment, there are four individual projects associated with project modules 10, 12, 14 and 16, respectively. The Project associated with project module 10 involves an owner, prime contractor and a subcontractor. The Project associated with project module 12 involves the same owner and prime contractor as the Project associated with project module 10. The Project associated with project module 14 involves the same owner and subcontractor as the Project associated with project module 10, as well as an additional subcontractor. The Project associated with project module 16 shares the additional subcontractor working on the Project associated with project module 14.

The system may include a project module 10, which is connected to multi-project transferal modules 20, 22 and 24, belonging for example to the owner, prime contractor and subcontractor for the Project associated with project module 10. There may be other project modules, such as 12, 14 and 16 operating independently for other projects. Thus, in the schematic of the example shown here, the project module 12 for the Project associated with project module12 will report to multi-project transferal modules 20 and 22, representing the same owner and prime contractor but not the same subcontractor. The project module 14 for the Project associated with project module 14 will report to multi-project transferal modules 20, 24 and 26, representing the same owner, the subcontractor of the Project associated with project module 10, now as prime contractor, and a new subcontractor. And the project module for the Project associated with project module 16 will report to multi-project transferal module 26, representing the new subcontractor now as a sole user of the system.

Figure 2:
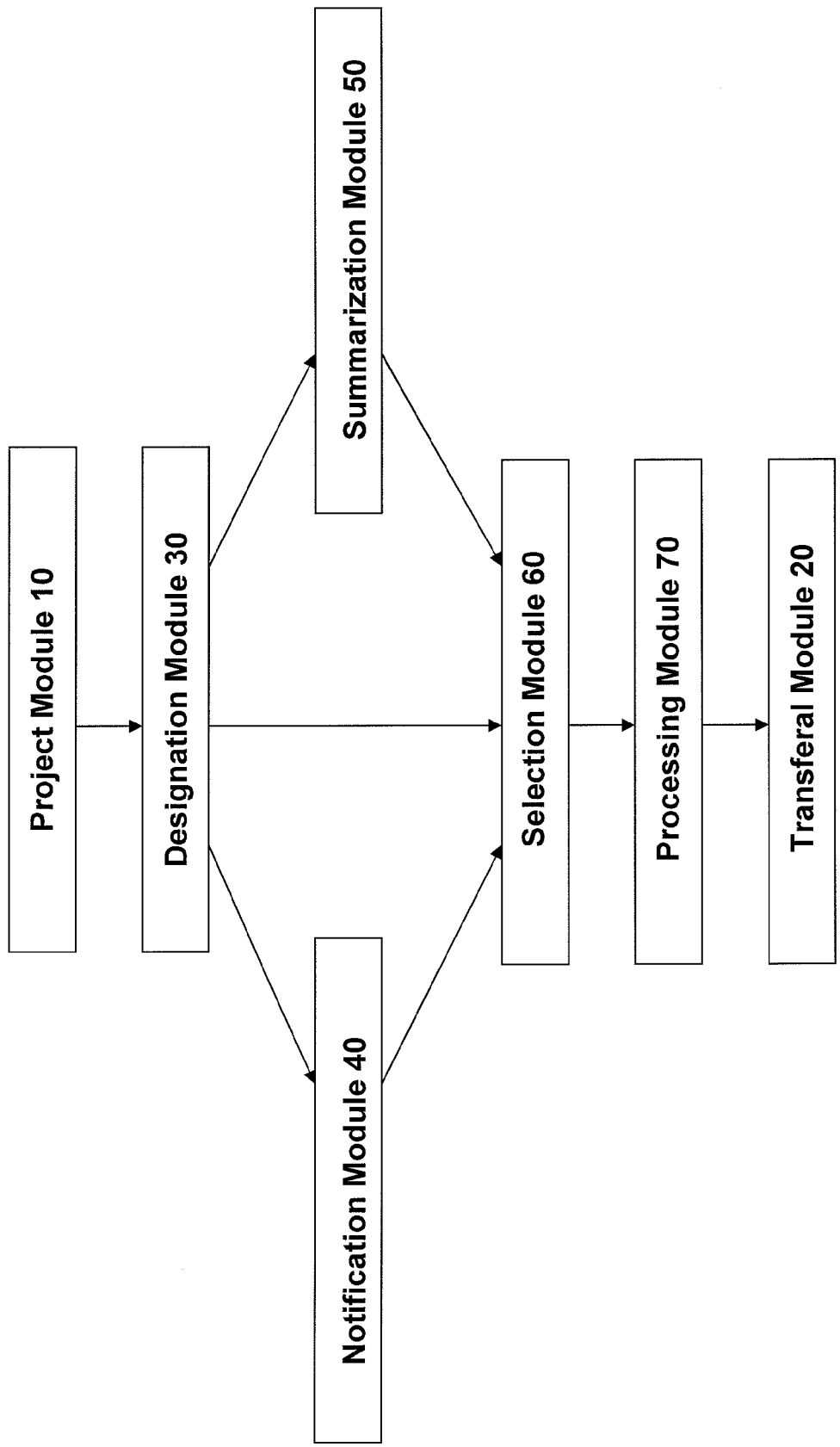
FIG. 2 is a schematic of another embodiment of a portion of a system in accordance with the present invention.

Referring to FIG. 2, there is shown a set of modules that may be employed in a system in accordance with the present invention. Designation module 30 may be employed to designate certain milestones or events, as described herein, as triggering events for various information transferal functions. The events in the designation module 30 can be input by one or more users of the system, selected by users of the system or generated by the designation module 30 itself.

The embodiment of FIG. 2 also includes a notification module 40 which can generate notifications in response to a signal from designation module 30. Similarly, summarization module 50 can generate summaries of information for transferal in response to a signal from designation module 30.

Transferal of information can be accomplished by notification involving notification module 30, by summarization involving summarization module 50 or as a result of a request by a user or a signal from designation module 30 directly to selection module 60. Typically, selection module 60 will be involved in most transfers of data since selection module 60 applies data selection criteria to maintain confidentiality, release data on a need to know basis or generate results based on confidential underlying data, such as schedule leveling, as described elsewhere herein.

Optionally, selected data may pass through a processing module 70 for processing of the data to customize it for a particular user, for example, using the user's terminology, coding system, reporting formats, etc. Finally, selected data, which may or may not be processed, is transferred via a transferal module 20. The system may be implemented with a set of modules for each user or, alternatively, each module can be set up to perform its designated function for all or a group of users of the system. For example, in some cases it may be advantageous to have one set of modules for subcontractors and another set of modules for project management.

Example for Project Scheduling

In one embodiment, the present invention, relating to project scheduling, implements the foregoing features by the provision of multiple relational databases. The project, or schedule module, may contain all schedule-related data necessary to perform scheduling for one project and to provide minimal information transfer for the primary purpose of supporting field, or line level, efforts. The transferal module may include additional codes, as well as proprietary information for extending the use of the schedule data to various entities, managers, etc. For example, the use of the schedule data can be extended to facilities managers, owners, vice-presidents, contractors, sub-contractors, etc.

Implementation of the transferal module addresses several issues. One example of a nomenclature issue that may be encountered numerous times in relation to a single project is the example of the naming of the project schedule. One owner, for example, may have many projects, several of which may relate to the same object, such as repairs or construction on an interstate highway. The contractor may have, at any one time, only one or few projects with that owner on that interstate highway. The transferal module can thus include a key or other suitable means, which provides the ability to associate a particular project name for a particular entity involved in that project with transferred information for that entity. Such a key can also be used to link other types of data relating to that project in a similar manner such that the transferal module can employ the proper nomenclature and terminology in reports for different entities related to the same project. This allows transfer of scheduling data using the lingo and jargon of the specific entity desiring the report, as well as presentation of data for that entity in the form desired by that entity, and avoids the need for different entities to agree on use of common nomenclature and terminology for the transferal module to function properly.

One way to implement the data key of the transferal module is to collect certain information from each entity in a manner that allows relation of this data using the data key. Thus, the transferal module can be programmed to, for example, employ information entered in certain data fields to populate a data key, assigning a token to each particular type of information. Then, the information can be cross-referenced for reporting using the token for that type of information and a second token for the entity desiring the report, in order to populate the report for that entity with the proper nomenclature, terminology and presentation of the data for that entity.

Similarly, the transferal module may populate other data keys with data collected from source scheduling engines. To implement this, the reporting module can be programmed to recognize the types and form of data that are obtainable from different scheduling engines.

The implementation of the invention can optionally be accomplished using one or more of the following:
- program level codes (global and enterprise level)
    - global level: owner of multiple sites versus a single sub-contractor used for multiple work packages
    - enterprise level: total equipment on owner's site versus total equipment of contractor for all projects in system.
    - each entity may be provided with its own hierarchy of global and enterprise levels
- project level codes—to events, activities and restraints
    - event, activity and restraint codes:
        - typically used for identification for sort or select
        - including character strings, numerical, date and Boolean argument fields
    - description codes:
        - typically used within textual descriptions of events, activities and restraints
        - including search by key word or character string
        - may also be within additional description fields reserved for notes or logs
    - resource codes:
        - typically used to identify all resources required for, or associated with an event, activity or restraint
        - including separate tracking of resources of each entity involved in a project (such as architect, engineer, owner, prime contractor, subcontractor, material vendor, etc.)
        - including support for multiple resource codes per event or activity
            - for example, by labor (one or more crafts,) equipment and materials
        - may include tiered control, for example, sub-contractors may be given control over only labor codes.
        - including restraint resource code that measure movement, rather than usage of resources, and which may be automated if usage of predecessor equals usage of successor activity or event
    - cost codes:
        - typically used to identify all costs required for, or associated with an event, activity or restraint
        - including separate tracking of costs of each entity involved in a project (such as architect, engineer, owner, prime contractor, subcontractor, material vendor, etc.)
            - for example, by estimate (budget,) bid (EV) and expense (actual)
        - including support for multiple cost codes per event or activity
            - for example, by labor (one or more crafts,) equipment and materials
        - lockout support may be provided for proprietary cost data
    - general comments on codes and code structures may also be provided in a file associated with the reporting module to aid users in inputting and interpretation of the schedule data.

The use of these various codes can provide the necessary links between otherwise potentially incompatible data obtained from the various parties involved with the project. For example, these codes can solve issues like differences in nomenclature, terminology, cost coding, etc.

The transferal module is provided with the ability to link the source schedule data, including, for example, events, restraints and activities of the scheduling module to additional, user-definable or system default code values of a multiple level, hierarchical secure and proprietary database in order to provide customizable reporting capabilities to various entities and project team members.

The transferal module may provide, for example, data storage and reporting of estimates, bids, contracts, actual data and costs and billed amounts. The transferal module may also provide data storage and reporting of various details relating to the schedule such as timing, costs, equipment, supplies, labor, bottlenecks, etc. The transferal module may also be provided with custom resource and cost codes and entries for each entity or project team members to permit use of their nomenclature and terminology in the information transfer, as well as to allow formatting of the information as desired for a particular report, notification or summary.

The transferal module may optionally be provided with the additional capability of multi-project scheduling. This would allow, for example, contractors and sub-contractors, to use the transferal module for integrating their schedules for multiple projects to avoid scheduling conflicts. This function can also be expanded to allow an entity to use the transferal module to schedule labor, equipment, supplies and other resources among various projects using the RM.

The transferal module may also include the ability to export files for projects that add an appropriate constraint wherever restraints between the various projects occur. Such restraints would preferably include restraints created by leveling routines in the primary schedule, as well as other restraints, for example, those created by scheduling conflicts for a particular contractor. Such export files may be annotated and globally removable to allow adjustments by authorized persons with access to the schedule. Such export files could be used to inform others involved in the schedule of scheduling restraints that may originate from a variety of sources. Similarly, the reporting module could be used to export files on other types of information that may affect the schedule, such as additional cash, resource or equipment availability.

The transferal module may also be provided with the ability to generate information on the latest project data, which may be sent as a file to desired locations or may be stored at a proprietary storage location. The information may be provided with restricted access to various entities or project team members with authorization. The data and transferal module may reside in a personal computer, in a server environment, on the World Wide Web, or any combination thereof.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for automated transferal of project data for a project wherein a plurality of entities are involved in the project, comprising the steps of:

providing a user interface configured to accept user identification information, user defined fields for activities in the project schedule, user defined activity codes, cost codes and project data from said plurality of entities, wherein said user interface employs said user defined fields for input and identification of one or more types of said project data, providing a project management application operably linked to said user interface, wherein said project management application receives the project data, user defined data fields, cost codes and user defined activity codes from said user interface, assigns user defined fields to activities in the project schedule and includes a transferal module configured to process the project data from multiple entities in order to relate the project data, cost codes and user defined activity codes to data keys in the transferal module, selection criteria for selecting a subset of said project data based on said user identification information and said user defined fields, and information about hierarchical levels for at least two of said multiple entities, providing a computer system having stored therein said project management application, said computer system comprising a memory and a processor, receiving and storing the project data in a project management database at said computer system, receiving said user identification information at said project management application from said user interface, said processor processing the project data from multiple entities to relate the project data to data keys in the transferal module, said processor applying said selection criteria of said project management application to create a subset of the project data based on said user identification information, said information about hierarchical levels and said user defined fields, wherein the subset of the project data is related to data keys in the transferal module for viewing by each entity identified by said user identification information, said processor processing the information transferred to each entity to convert terminology or coding identifying an attribute of the project, an activity or a resource, said terminology or coding being used by the project management application for describing a portion of the project data to terminology or coding including said user defined activity codes and cost codes used by at least one said entity, wherein the processor permits presentation or summarization of project data using hierarchical codes specific to one of a plurality of hierarchical levels within at least one said entity, cost codes and said user defined activity codes, and said computer system transferring the created subset of the project data selected and converted for a particular user to the particular user in one or more of said plurality of entities.

2. A method as claimed in claim 1, further comprising the step of notifying certain entities involved in the project based on predetermined criteria specifying the entities and conditions for notification.

3. A method as claimed in claim 1, further comprising the step of summarizing information of certain entities involved in the project based on predetermined criteria specifying the entities and conditions for summarization.

4. A method as claimed in claim 2, wherein the predetermined criteria further comprise criteria specifying one or more of the type of information to be provided and the format of information to be provided.

5. A method as claimed in claim 3, wherein the predetermined criteria further comprise criteria specifying one or more of the type of information to be provided and the format of information to be provided.

6. A method as claimed in claim 1, wherein said hierarchical codes comprise at least a work breakdown structure.

7. A method as claimed in claim 1, wherein said hierarchical codes comprise at least an organization breakdown structure.

8. A method as claimed in claim 1, wherein said hierarchical codes comprise at least an enterprise breakdown structure.

9. A method as claimed in claim 1, wherein said hierarchical codes comprise at least two of a work breakdown structure, an organizational breakdown structure and an enterprise breakdown structure.

10. A method as claimed in claim 1, wherein said hierarchical codes comprise a work breakdown structure, an organizational breakdown structure and an enterprise breakdown structure.

11. A method as claimed in claim 1, wherein one said selection criteria is based on a contract relating to said project.

12. A method as claimed in claim 1, wherein one said selection criteria is confidentiality of project data.

13. A method as claimed in claim 1, wherein access to project data is restricted to provide access to only data for which a particular entity has a need to know such project data.

14. A method as claimed in claim 1, wherein said user interface allows an entity to indicate that access to at least a portion of the project data under control of that entity may be granted to other entities.

15. A method as claimed in claim 2, further comprising the step of designating a specific event as a milestone to one or more of the entities involved in the project.

16. A method as claimed in claim 1, further comprising the step of designating limits selected from the group consisting of resource limits, cost limits and date limits which trigger notification to one or more entities involved in the project.

17. A method as claimed in claim 1, wherein at least one element of the project data is selected from the group consisting of: a time period associated with an activity, a date associated with the activity, user defined codes related to or associated with the activity, user defined resource codes, allocation of resources related to the activity, costs associated with the activity and organizational responsibility.

18. A method as claimed in claim 1, wherein the processing module further calculates a project schedule based on the project data obtained from the user interface.

19. A method as claimed in claim 1, wherein said selection criteria selects a subset of said project data also based on hierarchical codes specific to one of a plurality of hierarchical levels of responsibility within at least one said entity.

20. A system for automated transferal of project data for a project to a plurality of entities involved in the project, comprising:
- a user interface configured to accept user identification information and project data from said plurality of entities and user defined fields for activities in a project schedule for input and identification of one or more types of said project data, cost codes and user defined activity codes,
- a project management application operably linked to said user interface, wherein said project management application receives said project data, said user defined fields, cost codes and said user defined activity codes from said user interface, assigns user defined fields to activities in the project schedule and includes selection criteria for selecting a subset of said project data based on said user identification information, said user defined fields and information about hierarchical levels for at least two of said plurality of entities,
- a computer system having stored therein said project management application, said computer system comprising a memory and a processor,
- a transferal module configured to process the project data, cost codes and user defined activity codes from multiple entities in order to relate the project data to data keys in the transferal module,
- a selection module configured to select the subset of the project data to be transferred to an entity, said selection module selecting project data related to data keys in the transferal module for a particular entity based on one or more of confidentiality criteria, hierarchical codes and a choice of information requested and also based on said user identification information and said user defined fields,
- a processing module configured to process information to be transferred to each entity to convert terminology or coding identifying an attribute of the project, an activity or a resource, said terminology or coding being used by the project management application for describing a portion of the project data to terminology or coding including said cost codes and said user defined activity codes used by at least one said entity to describe the portion of the project data, wherein the processing module permits presentation or summarization of project data using hierarchical codes specific to at least one of a plurality of hierarchical levels within one said entity, cost codes and said user defined activity codes, and
- a reporting module configured to transfer the converted subset of the project data selected by said selection module for a particular user to that user in the entity for which said data was selected by said selection module.

21. A system as claimed in claim 20, further comprising a notification module configured to notify certain entities involved in the project based on predetermined criteria specifying the entities and conditions for notification.

22. A system as claimed in claim 20, further comprising a summarization module configured to summarize information for certain entities involved in the project based on predetermined criteria specifying the entities and conditions for summarization.

23. A system as claimed in claim 22, wherein a portion of said selection criteria is based on a contract in relation to said project.

24. A system as claimed in claim 21, further comprising a designation module configured to designate project milestones or limits which trigger said notification module to notify one or more entities.

25. A system as claimed in claim 20, wherein at least one element of the project data is selected from the group consisting of: a time period associated with an activity, a date associated with the activity, user defined codes related associated with the activity, user defined resource codes, allocation of resources related to the activity, costs associated with the activity and organizational responsibility.

26. A system as claimed in claim 20, wherein said selection criteria selects a subset of said project data also based on hierarchical codes specific to one of a plurality of hierarchical levels of responsibility within at least one said entity.

* * * * *